(12) United States Patent
Wollenweber et al.

(10) Patent No.: US 8,017,914 B2
(45) Date of Patent: Sep. 13, 2011

(54) METHOD AND SYSTEM FOR SCATTER CORRECTION

(75) Inventors: Scott David Wollenweber, Waukesha, IL (US); David Leo McDaniel, Dousman, WI (US); Charles William Stearns, Milwaukee, WI (US)

(73) Assignee: General Electric Company, Schenectady, NY (US)

( * ) Notice: Subject to any disclaimer, the term of this patent is extended or adjusted under 35 U.S.C. 154(b) by 496 days.

(21) Appl. No.: 12/270,437

(22) Filed: Nov. 13, 2008

(65) Prior Publication Data

US 2010/0116994 A1     May 13, 2010

(51) Int. Cl.
    *G01T 1/166*     (2006.01)
(52) U.S. Cl. ......... 250/363.04; 250/363.01; 250/363.02; 250/363.06
(58) Field of Classification Search ............. 250/363.01, 250/363.02, 363.04, 363.06
    See application file for complete search history.

(56) References Cited

U.S. PATENT DOCUMENTS

| | | | |
|---|---|---|---|
| 5,903,008 A | 5/1999 | Li | |
| 6,381,349 B1* | 4/2002 | Zeng et al. | 382/128 |
| 6,748,047 B2 | 6/2004 | Trotter et al. | |
| 7,039,227 B2* | 5/2006 | Tanaka et al. | 382/131 |
| 7,312,455 B2 | 12/2007 | Manjeshwar et al. | |
| 2009/0078874 A1* | 3/2009 | Schweizer et al. | 250/363.02 |
| 2009/0078876 A1* | 3/2009 | Chinn et al. | 250/363.04 |
| 2010/0078568 A1* | 4/2010 | Byars et al. | 250/362 |
| 2010/0168947 A1* | 7/2010 | Winso et al. | 701/23 |

OTHER PUBLICATIONS

Watson, C.C. et al.;"Advances in Scatter Correction for 3D PET/CT"; Nuclear Science Symposium Conference Record, 2004 IEEE, vol. 5, Issue Oct. 16-22, 2004 pp. 3008-3012.
Ollinger, J.M.; "Model-Based Scatter Correction for Fully 3D PET"; Phys. Med. Biol., 41 (1), pp. 153-176, 1996.
Wollenweber, S.D.; "Parameterization of a Model-Based 3D PET Scatter Correction"; IEEE Trans. Nucl. Sci., 49 (3), pp. 722-727.
Iatrou, M. et al.; "3D Implementation of Scatter Estimation in 3D PET"; Nuclear Science Symposium Conference Rcord, 2006; IEEE vol. 4, Oct. 29, 2006-Nov. 1, 2006, pp. 2142-2145.
Schueller, M.J. et al.; "Addressing the Third Gamma Probelm in PET"; Nuclear Science, IEEE Transactions on vol. 50, Issue 1, Feb. 2003, pp. 50-52.
Converse, A.K. et al.; "MicroPet Performance in the Presence of the Third Gamma"; Nuclear Science Symposium Conference Record, 2003 IEEE vol. 3, Oct. 19-25, 2003, pp. 1797-1799.

* cited by examiner

*Primary Examiner* — David Porta
*Assistant Examiner* — Christine Sung
(74) *Attorney, Agent, or Firm* — Dean Small; The Small Patent Law Group

(57) ABSTRACT

A method and apparatus are provided for correcting primary and secondary emission data. The method includes obtaining an emission data set having primary and secondary emission data representative of primary and secondary emission particles emitting from a region of interest and applying a scatter correction model to the emission data set to derive an estimated scatter vector. The method also includes comparing the emission data set to the estimated scatter vector to identify an amount of secondary emission data in the emission data set and correcting the emission data set based on the amount of secondary emission data identified in the comparing operation.

20 Claims, 5 Drawing Sheets

METHOD AND SYSTEM FOR SCATTER CORRECTION

BACKGROUND OF THE INVENTION

The invention relates generally to imaging systems, and more particularly, embodiments relate to a method and system for correcting scatter generated by a multi-modality imaging system.

Multi-modality imaging systems exist that scan using different modalities, such as, for example, Positron Emission Tomography (PET), Single Photon Emission Computed Tomography (SPECT), and Computed Tomography (CT). During operation of a PET imaging system, for example, a patient is initially injected with a radiopharmaceutical that emits positrons as the radiopharmaceutical decays. The emitted positrons travel a relatively short distance before the positrons encounter an electron, at which point an annihilation occurs whereby the electron and positron are annihilated and converted into two gamma photons each having an energy of 511 keV.

The annihilation events are typically identified by a time coincidence between the detection of the two 511 keV gamma photons in the two oppositely disposed detectors, i.e., the gamma photon emissions are detected virtually simultaneously by each detector. When two oppositely disposed gamma photons each strike an oppositely disposed detector to produce a time coincidence, gamma photons also identify a line of response, or LOR, along which the annihilation event has occurred.

The number of time coincidences, generally referred to as coincidence events, detected within a field of view (FOV) of the detector is the count rate of the detector. The count rate at each of two oppositely disposed detectors is generally referred to as singles counts, or singles. The coincidence event is identified if the time difference between the arrivals of signals at the oppositely disposed detectors is less than a predetermined time coincidence. The number of coincidence events per second registered is commonly referred to as prompt coincidences or prompts. Prompts may include true, random, and scatter coincidence events.

True coincidences are those physically correlated time coincidences, i.e., two gamma photons emitted in the process of annihilation or photons produced from the two primary gamma photons. Random coincidences are events that arise from the essentially simultaneous detection of two photons that arise from two different annihilation events that occur at nearly the same time. Scatter coincidence events occur because some gamma rays are deflected from their original direction due to interaction with a body part before reaching the detectors. It is desirable to reject the scatter events during the acquisition of emission sinograms, because the images generated using only the detected true coincidence events represent a true activity distribution of radio-activity in the scanned body part of the patient. Moreover, scattered radiations increase the background to the image, thus degrading the image contrast.

One conventional method to correct for scatter includes identifying the counts just outside the boundary of the patient, where no true coincidence counts are expected. The outside counts contain both random and scatter events. After subtracting random counts, the scatter counts attributed to the 511 keV events are subtracted from the prompt counts across the field of view to give true coincidence counts. This assumes that scattering is uniform throughout the FOV However, in addition to the scatter caused by annihilation of the 511 keV gamma photons, other radiopharmaceuticals used in PET imaging may cause additional counts that the scatter model attempts to correct. For example, when using the radiopharmaceutical Rb-82 for imaging, approximately 14% of annihilation events occur with the prompt emission of a 777 keV gamma. The 777 keV annihilation events are realized in the measured data as a nearly flat background. The background effect caused by the 777 keV annihilation events is problematic to the conventional scatter correction model. More specifically, the conventional scatter correction model utilizes scaling between the scatter correction model output and the measured data to account for an absolute scaling of the scatter correction model to the measured data. Because the conventional scatter correction algorithm models use only the data representing the 511 keV annihilation events to estimate the scatter correction, the background effect caused by the 777 keV annihilation events causes a mis-scaling of the scatter correction. Therefore there is a need for a scatter correction model that accounts for both the 511 keV scatter events and the 777 keV annihilation events to improve the quality of a medical image.

BRIEF DESCRIPTION OF THE INVENTION

In one embodiment, a method for correcting primary and secondary emission data is provided. The method includes obtaining an emission data set having primary and secondary emission data representative of primary and secondary emission particles emitting from a region of interest and applying a scatter correction model to the emission data set to derive an estimated scatter vector. The method also includes comparing the emission data set to the estimated scatter vector to identify an amount of secondary emission data in the emission data set and correcting the emission data set based on the amount of secondary emission data identified in the comparing operation.

In another embodiment, a medical imaging system is provided. The medical imaging system includes a detector array, a computer operationally coupled to the detector array, and a scatter correction module operationally coupled to the computer. The scatter correction model is programmed to obtain an emission data set having primary and secondary emission data representative of primary and secondary emission particles emitting from a region of interest, derive an estimated scatter vector, compare the emission data set to the estimated scatter vector to identify an amount of secondary emission data in the emission data set, and correct the emission data set based on the amount of secondary emission data identified in the comparing operation.

In a further embodiment, a computer readable medium is provided. The computer readable medium is encoded with a program programmed to instruct a scatter correction module to obtain an emission data set having primary and secondary emission data representative of primary and secondary emission particles emitting from a region of interest, derive an estimated scatter vector, compare the emission data set to the estimated scatter vector to identify an amount of secondary emission data in the emission data set, and correct the emission data set based on the amount of secondary emission data identified in the comparing operation.

DETAILED DESCRIPTION OF THE INVENTION

Figure 1:
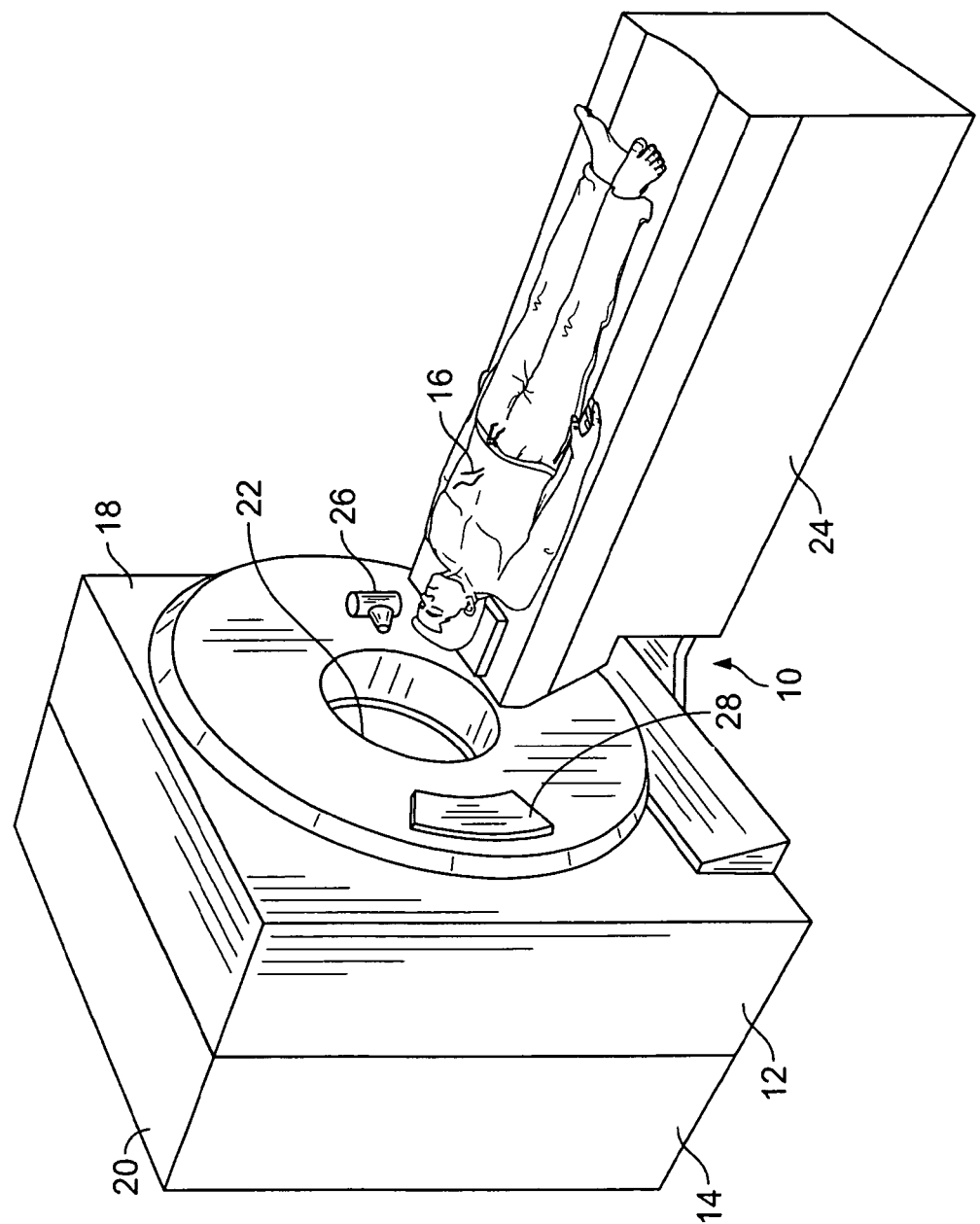
FIG. 1 is a pictorial view of an exemplary multi-modality imaging system in accordance with an embodiment of the present invention.

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Also as used herein, the phrase "reconstructing an image" is not intended to exclude embodiments of the present invention in which data representing an image is generated but a viewable image is not. Therefore, as used herein the term "image" broadly refers to both viewable images and data representing a viewable image. However, many embodiments generate, or are configured to generate, at least one viewable image.

Figure 2:
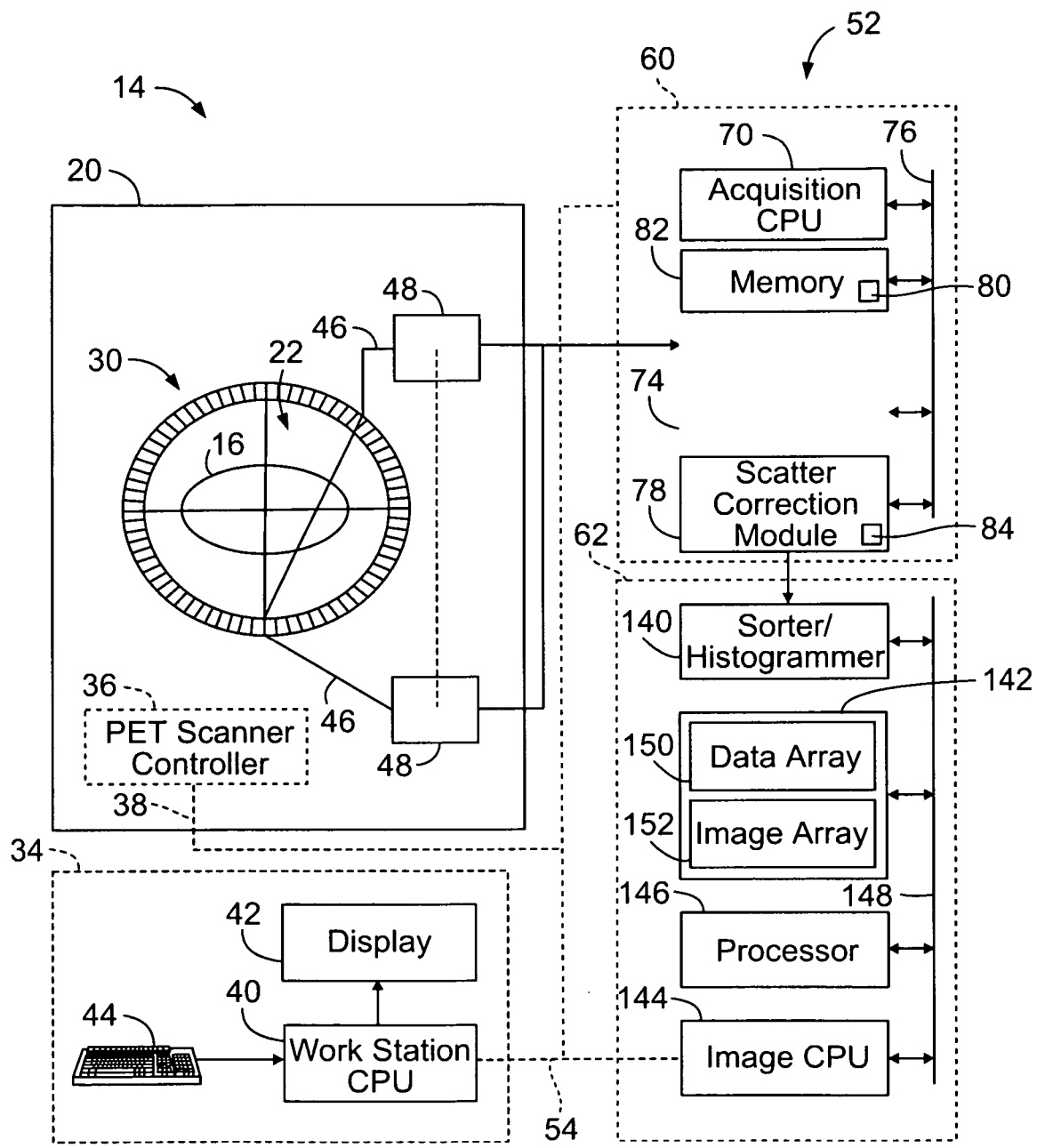
FIG. 2 is a block schematic diagram of the system illustrated in FIG. 1 in accordance with an embodiment of the present invention.

Various embodiments of the invention provide a multi-modality imaging system 10 as shown in FIGS. 1 and 2. Multi-modality imaging system 10 may be any type imaging system, for example, different types of medical imaging systems, such as a Positron Emission Tomography (PET), a Single Photon Emission Computed Tomography (SPECT), a Computed Tomography (CT), an ultrasound system, Magnetic Resonance Imaging (MRI) or any other system capable of or generating tomographic images. The various embodiments are not limited to multi-modality medical imaging systems, but may be used on a single modality medical imaging system such as a stand-along PET imaging system or a stand-along SPECT imaging system, for example. While, some of the embodiments are described herein with respect to a PET imaging system having a stationary detector, it should be realized that the embodiments described herein may also be used with other types of PET imaging systems. Other types of PET imaging systems may include, for example, a PET imaging system having a non-stationary detector or a Time-of-Flight (TOF) PET imaging system. Moreover, the various embodiments are not limited to medical imaging systems for imaging human subjects, but may include veterinary or non-medical systems for imaging non-human objects etc.

Referring to FIG. 1, the multi-modality imaging system 10 includes a first modality unit 12 and a second modality unit 14. The two modality units enable the multi-modality imaging system 10 to scan an object or patient 16 in a first modality using the first modality unit 12 and to scan the object 16 in a second modality using the second modality unit 14. The multi-modality imaging system 10 allows for multiple scans in different modalities to facilitate an increased diagnostic capability over single modality systems. In one embodiment, multi-modality imaging system 10 is a Computed Tomography/Positron Emission Tomography (CT/PET) imaging system 10, e.g. the first modality 12 is a CT imaging system and the second modality 14 is a PET imaging system. The CT/PET system 10 is shown as including a gantry 18 that is associated with a CT imaging system and a gantry 20 that is associated with a PET imaging system. During operation, the object 16 is positioned within a central opening 22, defined through the imaging system 10, using, for example, a motorized table 24.

The gantry 18 includes an x-ray source 26 that projects a beam of x-rays toward a detector array 28 on the opposite side of the gantry 18. Detector array 28 is formed by a plurality of detector rows (not shown) including a plurality of detector elements which together sense the projected x-rays that pass through the object 16. Each detector element produces an electrical signal that represents the intensity of an impinging x-ray beam and hence allows estimation of the attenuation of the beam as it passes through the object 16. During a scan to acquire x-ray projection data, gantry 18 and the components mounted thereon rotate about a center of rotation.

FIG. 2 is a block schematic diagram of the PET imaging system 14 illustrated in FIG. 1 in accordance with an embodiment of the present invention. The PET imaging system 14 includes a detector ring assembly 30 including a plurality of detector scintillators. Each scintillator may be coupled to multiple photomultiplier tubes (PMTs) or other light sensors that convert the light from the scintillator assembly into an electric signal. In addition to the scintillator-PMT combination, pixilated solid-state direct conversion detectors (e.g., CZT) may also be used to generate electric signals from the impact of the photons.

The detector ring assembly 30 includes the central opening 22, in which an object or patient, such as object 16 may be positioned, using, for example, the motorized table 24 (shown in FIG. 1). The motorized table 24 is aligned with the central axis of the detector ring assembly 30. During operation, the motorized table 24 moves the object 16 into the central opening 22 of the detector ring assembly 30 in response to one or more commands received from an operator workstation 34. More specifically, a PET scanner controller 36 responds to the commands received from an operator workstation 34 through a communication link 38. Therefore, the scanning operation is controlled from the operator workstation 34 through PET scanner controller 36.

The workstation 34 may be embodied as a personal computer (PC) that is positioned near the PET imaging system 14 and hard-wired to the PET scanner controller 36 via the communication link 38. The workstation 34 may also be embodied as a portable computer such as a laptop computer or a hand-held computer that transmits information to the PET scanner controller 36. In one embodiment, the communication link 38 may be hardwired between the PET scanner controller 36 and the workstation 34. Optionally, the communication link 38 may be a wireless communication link that enables information to be transmitted to or from the workstation to the PET scanner controller 36 wirelessly. In the exemplary embodiment, the workstation 34 controls real-time operation of the PET imaging system 14. The workstation 34 is also programmed to perform medical image diagnostic acquisition and reconstruction processes described herein.

The operator workstation 34 includes a central processing unit (CPU) or computer 40, a display 42 and an input device 44. As used herein, the term "computer" may include any processor-based or microprocessor-based system including systems using microcontrollers, reduced instruction set computers (RISC), application specific integrated circuits (ASICs), field programmable gate array (FPGAs), logic circuits, and any other circuit or processor capable of executing the functions described herein. The above examples are exemplary only, and are thus not intended to limit in any way the definition and/or meaning of the term "computer". In the exemplary embodiment, the computer 40 executes a set of instructions that are stored in one or more storage elements or memories, in order to process input data. The storage elements may also store data or other information as desired or needed. The storage element may be in the form of an information source or a physical memory element within the computer 40.

The set of instructions may include various commands that instruct the computer or processor 40 as a processing machine to perform specific operations such as the methods and processes of the various embodiments described herein. The set of instructions may be in the form of a software program. As used herein, the terms "software" and "'firmware'" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

The CPU 40 connects to the communication link 38 and receives inputs, e.g., user commands, from the input device 44. The input device 44 may be, for example, a keyboard, mouse, a touch-screen panel, and/or a voice recognition system, etc. Through input device 44 and associated control panel switches, the operator can control the operation of the PET imaging system 14 and the positioning of the object 16 for a scan. Similarly, the operator can control the display of the resulting image on the display 42 and can perform image-enhancement functions using programs executed by the workstation CPU 40.

During operation of one exemplary detector, when a photon collides with a scintillator on the detector ring assembly 30, the photon collision produces a scintilla on the scintillator. The scintillator produces an analog signal that is transmitted on a communication link 46 when a scintillation event occurs. A set of acquisition circuits 48 is provided to receive these analog signals. The acquisition circuits 48 process the analog signals to identify each valid event and provide a set of digital numbers or values indicative of the identified event. For example, this information indicates when the event took place and the position of the scintillation scintillator that detected the event.

The digital signals are transmitted through a communication link, for example, a cable, to a data acquisition controller 52. The data acquisition controller 52 is adapted to perform the scatter correction and image reconstruction processes as described herein and various other functions. In one embodiment, the controller 52 is positioned remotely from the workstation 34 and communicates with the workstation 34 and PET scanner controller 36 via a communication link 54. Optionally, the controller 52 may be embedded within the workstation 34. For example, the controller 52 may be physically separate from the CPU 40 and used in conjunction with the CPU 40 to improve or enhance the image processing speed. In another embodiment, the CPU 40 may perform all the processing functions performed by the controller 52, e.g. the controller 52 is embedded in the workstation 34 such that CPU 40 performs the normalization and image reconstruction processes performed by the controller 52.

In one embodiment, the data acquisition controller 52 includes a data acquisition processor 60 and an image reconstruction processor 62 that are interconnected via a communication link 64. During operation, the acquisition circuits 48 transmit the digital signals to the data acquisition processor 60. The data acquisition processor 60 then performs various image enhancing techniques on the digital signals and transmits the enhanced or corrected digital signals to the image reconstruction processor 62 as discussed in more detail below.

In the exemplary embodiment, the data acquisition processor 60 includes at least an acquisition CPU or computer 70. The data acquisition processor 60 also includes a coincidence detector 74. The acquisition CPU 70 controls communications on a back-plane bus 76 and on the communication link 64. During operation, the data acquisition processor 60 periodically samples the digital signals produced by the acquisition circuits 48. More specifically, the digital signals produced by the acquisition circuits 48 are transmitted to the coincidence detector 74.

The coincidence detector 74 receives the event data packets from the acquisition circuits 48 and counts the single channel events recorded by each detector element. The coincidence detector 74 then determines if any two of the detected events are in coincidence. Coincidence is determined by a number of factors. First, the time markers in each event data packet must be within a predetermined time period, for example, 12.5 nanoseconds, of each other. Second, the line-of-response (LOR) formed by a straight line joining the two detectors that detect the coincidence event should pass through the field of view in the PET imaging system 14. Events that cannot be paired are discarded. Coincident event pairs are located and recorded as a coincidence data packet that is communicated through the back-plane bus 76 from the coincidence detector 74 to a scatter correction module 78.

The output from the coincidence detector 74 including the true, random, and scatter events is referred to herein as an emission data set 80. In one embodiment, the emission data set 80 may be stored in a memory 82 that is located in the data acquisition processor 60. Optionally, the emission data set 80 may be stored in the workstation 34.

In the exemplary embodiment, the emission data set 80 includes both primary and secondary emission data. The primary emission data is emission data or events that are representative of the true, random, and scatter events caused by the emission of the 511 keV gamma photons during an annihilation event. The secondary emission data is emission data that is representative of other gamma photons that are emitted during an annihilation event. The secondary emission data includes gamma photons having an energy that is different than the 511 keV gamma photons. One example of secondary emission data includes scatter or un-scattered events caused by the emission of gamma photons having an energy of 777 keV when using a Rb-82 radiopharmaceutical. It should be realized that the 777 keV gamma photons are exemplary only, and that the secondary emission data may include gamma photons emitted using a wide variety radiopharmaceuticals other than Rb-82.

Figure 3:
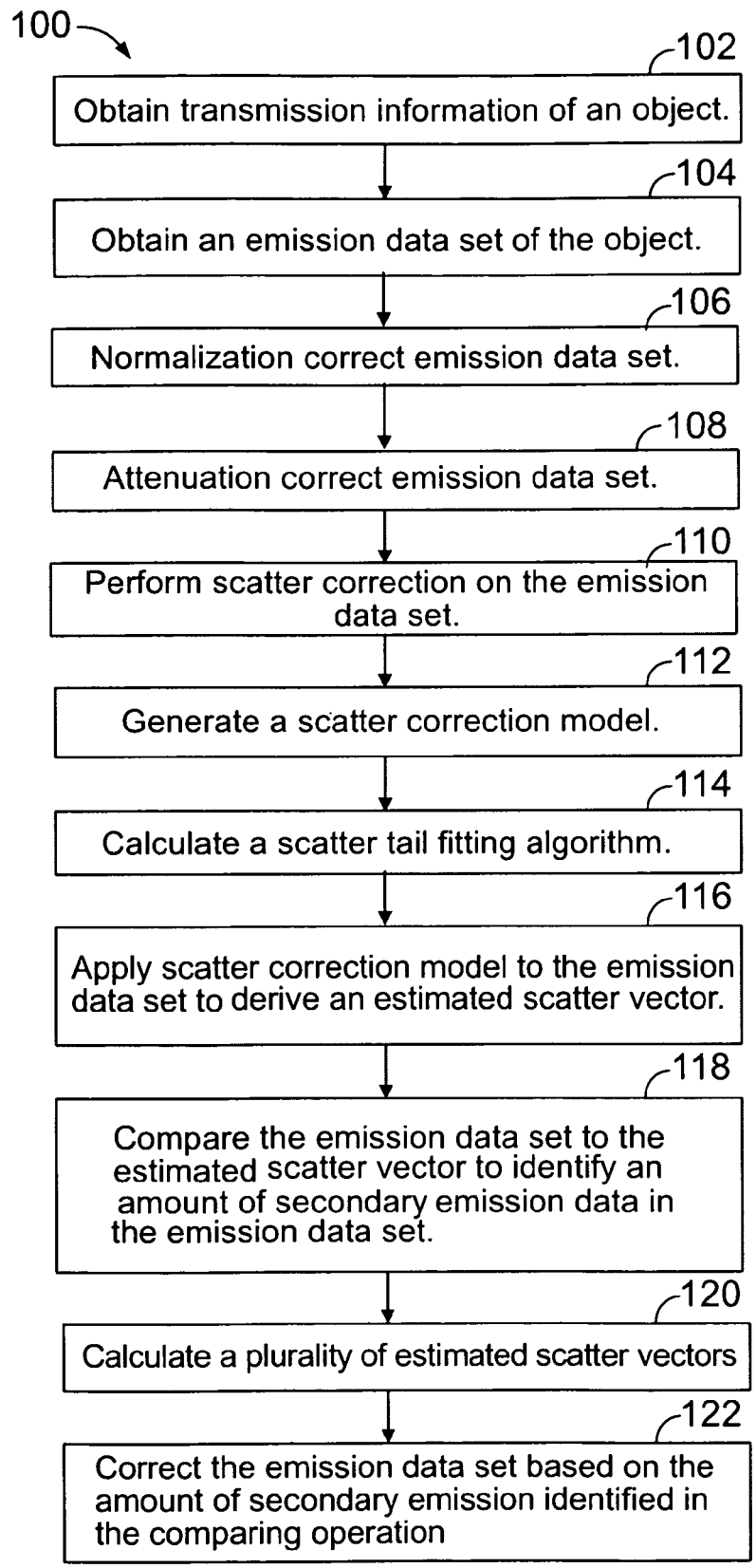
FIG. 3 is a simplified block diagram of an exemplary method performed by the PET imaging system shown in FIG. 2 in accordance with an embodiment of the present invention.

FIG. 3 is a flowchart illustrating an exemplary method 100 for scatter correcting the emission data set 80 that may be performed using the scatter correction module 78 shown in FIG. 2, for example. The method 100 performs scatter correction on the emission data set 80 to account for both the 511 keV and 777 keV annihilation events and to improve the quality of a medical image. More specifically, the method 100 identifies scatter coincidence events within the emission data set 80 and removes the scatter events to enable the true events to be used to reconstruct and image of the object 16 shown in FIG. 1.

At 102, transmission data of the object 16 (shown in FIG. 1) is obtained. The transmission data may be obtained by scanning the object 16 using the CT system 12. Optionally, the transmission data may be obtained from a previous scan of the object 16, wherein the transmission data has been stored in a memory device, such as memory device 82.

At 104 the emission data set 80 is obtained using the second modality 14 (shown in FIG. 2). The emission data set 80 may be obtained by performing an emission scan of the object 16 to produce the emission data set 80. Optionally, the emission data set 80 may be obtained from data collected during a previous scan of the object 16, wherein the emission data set 80 has been stored in a memory, such as memory device 82 (shown in FIG. 2). The emission data set 80 may be stored in any format, such as a list mode data set for example. Moreover, the emission data set 80 and an attenuation data set may be obtained from a remote memory such as the memory installed in workstation 34 (shown in FIG. 2). The emission data set 80 and the attenuation data set may be obtained during real-time. For example, the methods described herein may be performed on emission data as the emission data is received from the acquisition circuits 48 during a real-time examination of the object 16. In the exemplary embodiment, the emission data set 80 includes the primary and secondary emission data representative of primary and secondary emission particles emitting from a region of interest.

At 106, the emission data set is corrected for normalization. Normalization is the method for correcting for the effect caused by the sensitivity of a detector pair wherein the detector pair varies from pair to pair, resulting in non-uniformity of the raw data. In one embodiment, normalization of the emission data set 80 is accomplished by exposing uniformly all the detector scintillators in the detector ring assembly 30 to a 511 kev photon source and then calculating a normalization factor for each pair of scintillators by dividing the average counts of all detector pairs (LORs) by the individual pair count. The normalization factor is then applied to each detector pair data in the acquisition sonogram.

At 108, the emission data set 80 is attenuation corrected. More specifically, because different LORs must traverse different thicknesses of tissue, the photons are attenuated differently. In one embodiment, attenuation correction of the emission data set 80 includes utilizing the transmission data of the object 16 obtained at 102 to perform attenuation correction of the emission data set 80. One exemplary method for attenuation correction includes obtaining a blank CT scan without the object 16 in the scanner and storing the CT scan for subsequent use in the calculation of a plurality of attenuation correction factors for the object 16. The CT transmission scan of the object is then obtained and a map of the attenuation correction factors is generated from the scan of the object 16 and the blank scan. The map of attenuation correction factors is then applied to correct the emission data set 80 obtained by scanning the object 16.

At 110, the scatter correction module 78 performs scatter correction on the emission data set 80. In the exemplary embodiment, the scatter correction module 78 includes a scatter model 84 to perform scatter correction on the emission data set 80. The scatter correction model 84 performs scatter correction by identifying scatter coincidence events within the emission data set 80 to enable the true coincidence events to be used to reconstruct and image of the object 16. Moreover, the scatter correction model 84 accounts for both the 511 keV and 777 keV annihilation events and to improve the quality of a medical image.

The scatter correction model 84 may also be embodied as a set of instructions or an algorithm. For example, the scatter correction model 84 may be a mathematical algorithm or a logical representation of the processes utilized to identify scatter coincidence events within the emission data set 80 as described herein. The mathematical scatter correction model 84 utilizes mathematical language to identify scatter coincidence events within the emission data set 80. The scatter correction model 84 may also perform, among other things, normalization of the emission data set 80 and attenuation correction of the emission data set 80. The following paragraphs describe at least some of the exemplary operations that may be performed by either the scatter correction module 78 and/or scatter correction model 84 to perform scatter correction on the emission data set 80.

Figure 4:
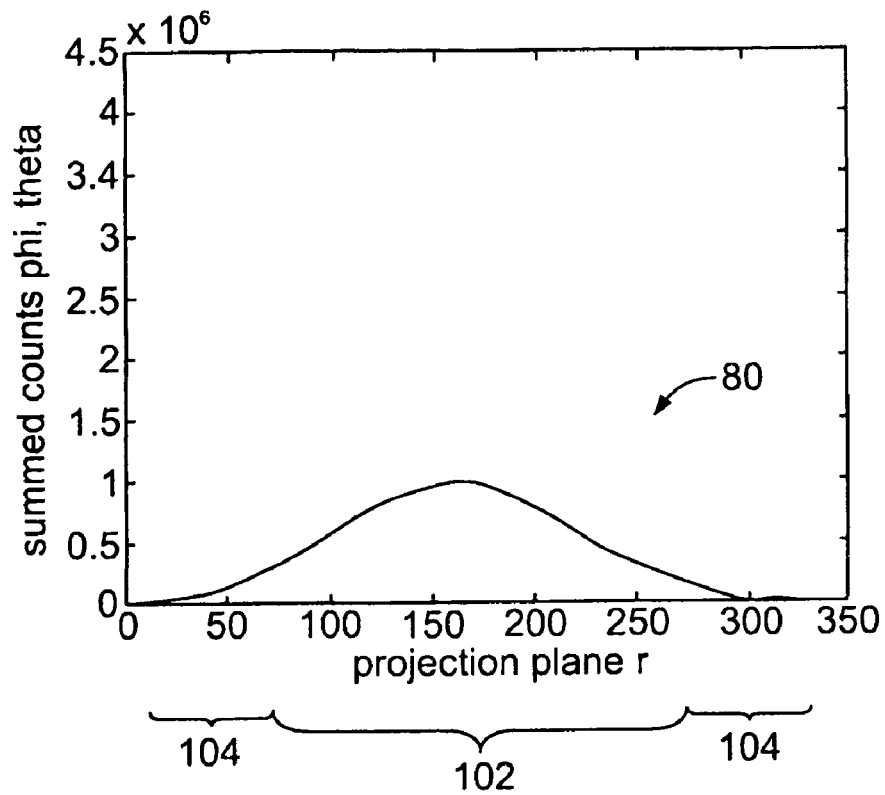
FIG. 4 is a graphical illustration of an exemplary emission data set in accordance with an embodiment of the present invention.

At 112, the scatter correction module 78 generates the scatter correction model 84 using the emission data set 80. To generate the scatter correction model 84, the scatter correction module 78 receives the emission data set 80 from the coincidence detector 74 shown in FIG. 2. A graphical illustration of an exemplary emission data set received from the coincidence detector 74 is shown in FIG. 4 wherein the X-axis represents a plurality of projection planes (approximately 350 projection planes) and the Y-axis represents the summed counts over each projection plane. The scatter correction model 84 first identifies a field-of-view (FOV) 102 within the emission data set 80. In the exemplary embodiment, the FOV 102 is identified using at least the geometry of the PET imaging system 14. For example, the FOV 102 may be identified based on the CT image of the object. Once, the FOV 102 is identified, the emission data that is identified as being outside the FOV 102 is identified. The emission data falling outside the FOV 102 is referred to herein as the tails or tail regions 104.

Returning to FIG. 3, at 114, the tail regions 104 are used to calculate a scatter tail fitting algorithm for each projection plane. The scatter tail fitting algorithm is a portion of the scatter correction model 84. In the exemplary embodiment, the tail regions 104 identify the counts just outside the FOV 102, where no true coincidence counts are expected. Moreover, the tail regions 104 identify the scatter events that are attributable to the 511 keV photon emissions and the unscattered and scattered 777 keV photon emissions.

Figure 5:
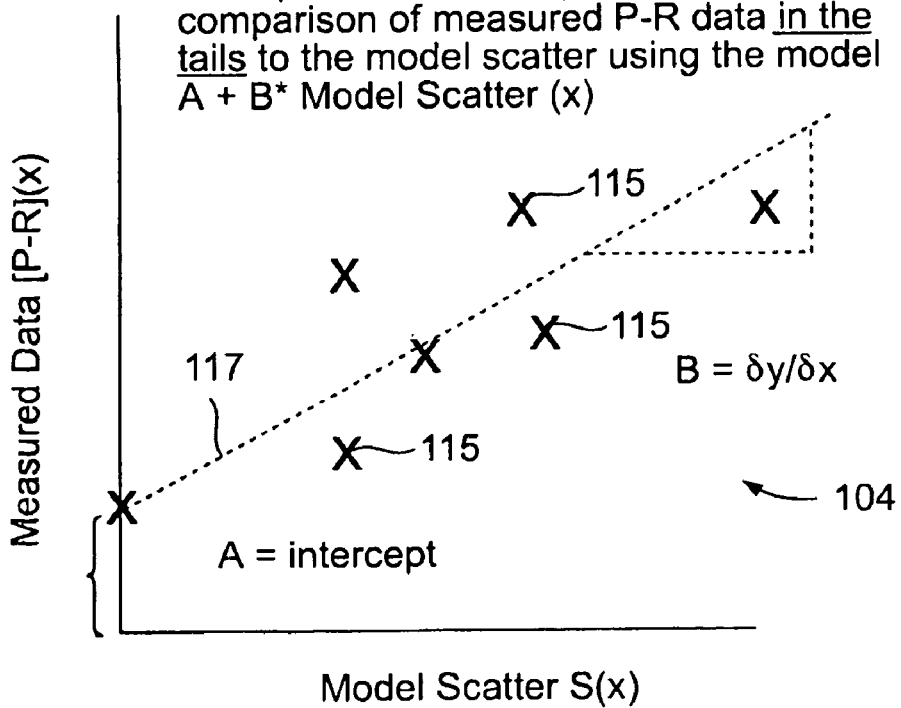
FIG. 5 is a graphical illustration of a single tail region that may be utilized to calculate a scatter tail fitting algorithm in accordance with an embodiment of the present invention.

For example, FIG. 5 is a graphical illustration of a portion of the exemplary emission data in a tail region 104 that is used to identify the measured vs. modeled scatter events that are attributable to both the 511 keV photon emissions and the 777 keV photon emissions. The X-axis represents the model scatter $S(x)$ and the Y-axis represents the measured emission data (Prompts-Randoms). Randoms relate to the inability of the detector ring assembly 30 to distinguish between two radiation-induced scintillation events emanating from different annihilation events but detected very close together in time. The exemplary emission data within the tail region 104 is used in the scatter tail fitting algorithm. The tail portion 104 includes a plurality of emission data points 115. Each point 115 represents a two parameter comparison of the measured data in the tail region 104 to the model scatter $S(x)$.

Returning to FIG. 3, at 116, the scatter correction model 84 is applied to the emission data set 80 to derive an estimated scatter vector 117 (shown in FIG. 5). The estimated scatter vector 117 represents the quantity of scatter in the tail regions 104 that is attributable to both the 511 keV photons and the 777 keV photons. In the exemplary embodiment, the scatter vector 117 may be derived or fit to the emission data in the tail region 104 using a linear or non-linear least squares fit algorithm.

One exemplary algorithm that may be used to fit the emission data in the tail region 104 is a linear least squares fit algorithm in accordance with:

$$\Delta = \sum_i \frac{scat_i^2}{data_i} * \sum_i \frac{1}{data_i} - \left(\sum_i \frac{scat_i}{data_i}\right)^2 \quad (1)$$

$$A = \frac{1}{\Delta} * \left(N * \sum_i \frac{scat_i^2}{data_i} - \sum_i scat_i * \sum_i \frac{scat_i}{data_i}\right) \quad (2)$$

$$B = \frac{1}{\Delta} * \left(\sum_i scat_i * \sum_i \frac{1}{data_i} - N * \sum_i \frac{scat_i}{data_i}\right) \quad (3)$$

In equations 1-3, scat is the output of the model-based scatter algorithm (single plus multiple scatter) for all points i in the data, data is the measured emission events for all points i, corrected for randoms, normalization, and dead-time losses, N is the projection plane, A is the Y-axis intercept, and B is the slope of the estimated scatter vector. The final scatter estimate is then found from (scatter estimate for data=A+B*scatterModel), where scatterModel inherently assumes that the scatter events are attributable to 511 keV event scatter only.

As shown above in Equations 1-3, an estimated scatter vector 117 is generated for each projection plane. Moreover, for each projection plane, the emission counts (P-D) in the tail regions 104 are stored in a vector summed over angles. For example, FIG. 5 illustrates a single estimated scatter vector 117, for a single plane, that is estimated using the linear least squares fit algorithm described above. In the exemplary embodiment, the model parameters A and B generated in Equations 2 and 3 above, are used to calculate scatter over an entire projection plane. For example, a projection plane of scatter may be calculated in accordance with:

$$\text{scatter3d}[:,v,:] = \text{param\_A}/n\text{Phi} + \text{param\_B} * \text{scatter3d}[:,v,:]. \quad (4)$$

In equation 4 scatter3d is the scatter attributed to the emission of both 511 keV photons and 777 keV photons over a single projection plane, param_A is the Y-axis intercept as calculated above in Equation 2, param_B is the slope of the estimated scatter vector as calculated above in Equation 3, and n is a single projection angle Phi. In the exemplary embodiment, a filter is applied to each parameter A and B to filter the scatter estimate. In one embodiment, the filter is applied to each parameter A and B using the four nearest projection plane elements in both a Z direction and an angle direction Phi.

Returning to FIG. 3, at 118, the emission data set 80 is compared to the estimated scatter vector to identify an amount of secondary emission data in the emission data set 80. Comparing includes fitting the estimated or model scatter vector 117 to the measured or emission data set 80. For example, referring again to FIG. 5, the model scatter vector 117 is fit to the measured data with a linear least-squares model Data[ ]=param_A+param_B*Scatter[ ]. The projection plane of scatter is then calculated with the model fit parameters A and B. The model fit parameter A represents where the estimated scatter vector 117 intersects the Y-axis and the model fit parameter B represents the slope of the estimated scatter vector 117. The model illustrated in FIG. 5 represents a model scatter vector 117 fitted to the emission data set 80 over a single projection plane. Moreover, the model scatter vector 117 is shifted along the Y-axis a distance 130. The distance 130 represents the amount of secondary emission data identified during the comparing operation. In the exemplary embodiment, distance 130 represents the total contribution to the scatter estimate of the emission data set 80 that are not attributable to the 511 keV annihilation events.

For example, as discussed above, the scatter includes scatter caused by both 511 keV annihilation events and events that occur at a different energy level. In the exemplary embodiment, the scatter vector 117 represents the contribution to scatter from the annihilation events having a 511 keV energy level. Whereas, the distance or shift 130 represents the contribution to scatter from the annihilation events having an energy level that is different from 511 keV energy level. In the exemplary embodiment, the distance or shift 130 represents the contribution to scatter from the annihilation events having an energy level that is 777 keV.

In the exemplary embodiment, the scatter correction model parameters derived above in Equations 1-3 are applied to the emission data in the regions 104 outside the FOV 102. More specifically, at 120, the scatter correction model 84 calculates or derives a plurality of estimated scatter vectors 117 (shown in FIG. 5). One scatter vector 117 is generated for each projection angle Phi over a plurality of projection planes and the estimated scatter vectors 117 are summed over the angle Phi for the detector geometry. The scatter correction model 84 then applies the plurality of estimated scatter vectors to the emission data set 80 to determine a final estimate of scatter in the emission data set 80, e.g. the total secondary emission data identified in the comparing operation.

Returning to FIG. 3, at 122 the emission data set 80 is corrected based on the amount of secondary emission data identified in the comparing operation. More specifically, scatter representative of the annihilation events having an energy level that is different from 511 keV energy level is subtracted from the annihilation events having an energy level that is 511 keV to generate the final scatter estimate. The final scatter estimate is applied to the emission data within the FOV 102 to correct for scatter. In the exemplary embodiment, final scatter estimate is subtracted from the emission data within the FOV 102 to generate corrected emission data. More specifically, the final scatter estimate is subtracted from the prompt counts across the FOV 102 to produce true coincidence counts.

Figure 6:
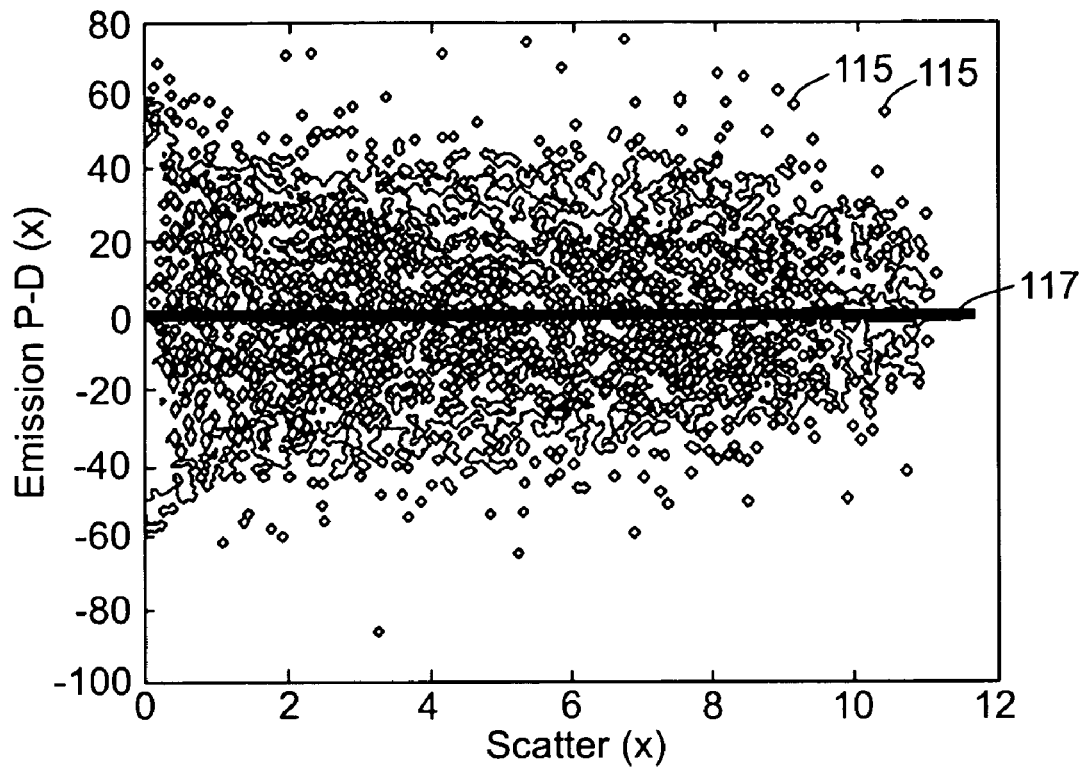
FIG. 6 is a graphical illustration of the scatter tail fitting algorithm applied to an exemplary emission data set in accordance with an embodiment of the present invention.

FIG. 6 is a graphical illustration of the estimated scatter vector 117 fitted to exemplary emission data within an exemplary tail region 104 us the scatter tail fitting algorithm in accordance with an embodiment of the present invention. The X-axis represents the model scatter $S(x)$ and the Y-axis represents the measure emission data (Prompts-Randoms). In the exemplary embodiment, the illustration shows the estimated scatter vector 117 fitted to the plurality of points 115 from a single projection plane. The estimated scatter vector is parameterized in accordance with $Y=A+Bx$, where A and B are the fitting parameters derived using the equations described above. As shown in FIG. 6, the estimated scatter vector 117 is approximately centrally located within the emission data and therefore accurately accounts for the secondary emission data within the tail regions 104 of the emission data set 80

Figure 7:
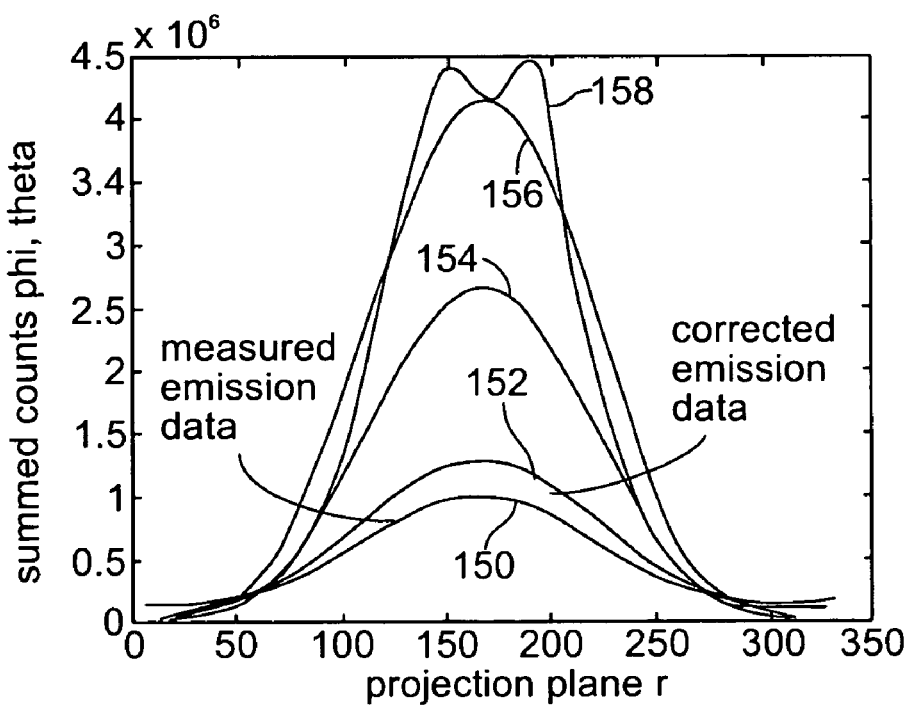
FIG. 7 is a graphical illustration of an exemplary emission data set compared to a scatter corrected emission data set in accordance with an embodiment of the present invention.

FIG. 7 is a graphical illustration of an exemplary emission data set compared to a scatter corrected emission data set in accordance with an embodiment of the present invention. The X-axis represents the location within a projection plane and the Y-axis represents the summed counts over the range of angles Phi and Theta. Item 158 represents the measured emission data, e.g. the emission data set 80, and items 156, 154, 152 and 150 represent the emission data set 80 after the emission data set 80 is corrected to remove the secondary emission data, using a previous scatter correction approach versus embodiments of the methods described herein. Items 154 and 156 represent the emission data set 80 corrected using a conventional algorithm with different embodiments of tail location 104. Items 152 and 150 represent the emission data set 80 corrected using different embodiments of the scatter correction model described herein. Accordingly, FIG. 7 illustrates that calculating and removing the secondary emission from the emission data set 80 results in a corrected image data set primarily including true events.

The corrected emission data set is then transmitted to a sorter/histogrammer 140 to generate a data structure known as a histogram. A histogram includes a large number of cells, where each cell corresponds to a unique pair of detector scintillators in the PET scanner. Because a PET scanner typically includes thousands of detector scintillators, the histogram typically includes millions of cells. Each cell of the histogram also stores a count value representing the number of coincidence events detected by the pair of detector scintillators for that cell during the scan. At the end of the scan, the data in the histogram is used to reconstruct an image of the patient. The completed histogram containing all the data from the scan is commonly referred to as a "result histogram." The term "histogrammer" generally refers to the components of the scanner, e.g., processor and memory, which carry out the function of creating the histogram.

The image reconstruction processor 62 also includes a memory module 142, an image CPU 144, an array processor 146, and a communication bus 148. During operation, the sorter/histogrammer 140 counts all events occurring along each projection ray and organizes the events into 3D data. This 3D data, or sinograms, is organized in one exemplary embodiment as a data array 150. The data array 150 is stored in the memory module 142. The communication bus 148 is linked to the communication link 76 through the image CPU 144. The image CPU 144 controls communication through communication bus 148. The array processor 146 is also connected to the communication bus 148. The array processor 146 receives the data array 150 as an input and reconstructs images in the form of image arrays 152. Resulting image arrays 152 are then stored in memory module 142. The images stored in the image array 152 are communicated by the image CPU 144 to the operator workstation 34.

It should be realized that the correction terms shown in Equations 4 and 5 are exemplary only and that other correction terms may be utilized to correct for randoms occurring in the data. For example, in another exemplary embodiment, a correction term may be allocated to the entire task. More specifically, in this embodiment, the imaging data may be transmitted to the reconstruction processor At least one technical effect of the methods and apparatus described herein provides the ability to scatter correct emission data that includes both 511 keV photon emissions and photon emissions having an energy that is different than 511 keV, such as for example, photons having an energy of 777 keV. The scatter correction estimate described herein may be used with radiopharmaceuticals such as Rb-82 which produce co-emission events consisting of a 777 keV gamma. The methods and apparatus described herein account for both 511 keV scattered gammas and scattered and un-scattered 777 keV co-emission gammas to reduce and or eliminate the background effect caused by the 777 keV gammas. The estimated scatter vectors described herein are calculated using data that is easily available in the system. Some embodiments of the present invention provide a machine-readable medium or media having instructions recorded thereon for a processor or computer to operate an imaging apparatus to perform an embodiment of a method described herein. The medium or media may be any type of CD-ROM, DVD, floppy disk, hard disk, optical disk, flash RAM drive, or other type of computer-readable medium or a combination thereof.

The various embodiments and/or components, for example, the monitor or display, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a floppy disk drive, optical disk drive, and the like. The storage device may also be other similar means for loading computer programs or other instructions into the computer or processor.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. For example, the ordering of steps recited in a method need not be performed in a particular order unless explicitly stated or implicitly required (e.g., one step requires the results or a product of a previous step to be available). Many other embodiments will be apparent to those of skill in the art upon reviewing and understanding the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for correcting an emission data set, said method comprising:
   obtaining an emission data set having primary and secondary emission data representative of primary and secondary emission particles, respectively, emitting from a region of interest;
   applying a scatter correction model to the emission data set to derive an estimated scatter vector;
   comparing the emission data set to the estimated scatter vector to identify an amount of secondary emission data in the emission data set; and
   correcting the emission data set based on an amount of scatter and the secondary emission data identified in the comparing operation.

2. A method in accordance with claim 1 wherein obtaining further comprises obtaining an emission data set having primary and secondary emission data representative of primary particles having an energy of 511 keV and secondary emission particles having an energy of approximately gamma photons each having an energy different than 511 keV.

3. A method in accordance with claim 1 further comprising:
   fitting the estimated scatter vector to the emission data outside a field of view to determine the quantity of secondary emission particles in a tail region portion of the emission data set; and
   subtracting the determined quantity from the emission data in the tail region portion of the emission data set.

4. A method in accordance with claim 1 wherein the emission data set includes a plurality of projection planes, each projection plane including emission data, said method further comprises:
   fitting the estimated scatter vector to the emission data set in each projection plane using a least squares fit algorithm to determine the quantity of secondary emission particles in a tail region portion of the emission data set for each projection plane; and
   using a summed set of estimated scatter vectors to correct the emission data in the field of view.

5. A method in accordance with claim 1 wherein comparing further comprises:
   fitting the estimated scatter vector to emission data outside a field of view using a using a linear least squares fit algorithm to determine a quantity of secondary emission particles in the emission data outside a field of view; and
   subtracting the determined quantity from the emission data in the tail region portion of the emission data set to generate a final scatter estimate.

6. A method in accordance with claim 1 further comprising:
   summing a plurality of estimated scatter vectors to generate a final scatter estimate that represents an amount of secondary emission data in a tail region portion of the emission data set, wherein each estimated scatter vector represents the scatter in a tail region at a different projection plane and projection angle; and
   subtracting the final scatter estimate from emission data in the field of view.

7. A method in accordance with claim 1 further comprising:
   applying the scatter correction model to emission data in the emission data set that is outside the FOV using a linear least squares fit algorithm to derive an estimated scatter vector for each projection plane and projection angle in the emission data set; and
   summing a plurality of estimated scatter vectors to generate a final scatter estimate that represents an amount of secondary emission data in the emission data outside the field of view, wherein each estimated scatter vector represents the scatter in the emission data outside the field of view at a different projection plane and projection angle.

8. A medical imaging system comprising:
   a detector array; and
   a scatter correction module operationally coupled to the detector array, the scatter correction model is programmed to:
   obtain an emission data set having primary and secondary emission data representative of primary and secondary emission particles, respectively, emitting from a region of interest;
   derive an estimated scatter vector;
   compare the emission data set to the estimated scatter vector to identify an amount of secondary emission data in the emission data set; and
   correct the emission data set based on an amount of scatter and the secondary emission data identified in the comparing operation.

9. A medical imaging system in accordance with claim 8, wherein said detector array comprises a Positron Emission Tomography (PET) detector, said imaging data comprises a stream of PET imaging data, and said scatter correction module is further programmed to obtain an emission data set having primary and secondary emission data representative of primary particles having an energy of 511 keV and secondary emission particles having an energy of approximately gamma photons each having an energy different than 511 keV.

10. A medical imaging system in accordance with claim 8, wherein said scatter correction module is further programmed to:
   fit the estimated scatter vector to the emission data outside the field of view using a linear least squares fit algorithm to determine the quantity of secondary emission particles in a tail region portion of the emission data set; and
   subtract the determined quantity from the emission data in the tail region portion of the emission data set.

11. A medical imaging system in accordance with claim 8, wherein said scatter correction module is further programmed to:
fit the estimated scatter vector to the emission data set in each projection plane using a least squares fit algorithm to determine the quantity of secondary emission particles in a tail region portion of the emission data set for each projection plane; and
subtract a summed set of estimated scatter vectors from the emission data in the tail region portion of the emission data set.

12. A medical imaging system in accordance with claim 8, wherein said scatter correction module is further programmed to:
fit the estimated scatter vector to the emission data set using a linear least squares fit algorithm to determine the quantity of secondary emission particles in a tail region portion of the emission data set; and
subtract the determined quantity from the emission data in the tail region portion of the emission data set to generate a final scatter estimate.

13. A medical imaging system in accordance with claim 8, wherein said scatter correction module is further programmed to:
sum a plurality of estimated scatter vectors to generate a final scatter estimate that represents an amount of secondary emission data in a tail region portion of the emission data set, wherein each estimated scatter vector represents the scatter in a tail region at a different projection plane and projection angle; and
subtract the final scatter estimate from emission data in the field of view.

14. A medical imaging system in accordance with claim 8, wherein said scatter correction module is further programmed to:
apply the scatter correction model to emission data in the emission data set that is outside the FOV using a linear least squares fit algorithm to derive an estimated scatter vector for each projection plane and projection angle in the emission data set; and
sum a plurality of estimated scatter vectors to generate a final scatter estimate that represents an amount of secondary emission data in the emission data outside the field of view, wherein each estimated scatter vector represents the scatter in the emission data outside the field of view at a different projection plane and projection angle.

15. A computer readable medium encoded with a program programmed to instruct a scatter correction module to:
obtain an emission data set having primary and secondary emission data representative of primary and secondary emission particles, respectively, emitting from a region of interest;
derive an estimated scatter vector;
compare the emission data set to the estimated scatter vector to identify an amount of secondary emission data in the emission data set; and
correct the emission data set based on an amount of scatter and the secondary emission data identified in the comparing operation.

16. A computer readable medium in accordance with claim 15 wherein the program is further programmed to instruct the scatter correction module to:
fit the estimated scatter vector to the emission data outside the field of view using a linear least squares fit algorithm to determine the quantity of secondary emission particles in a tail region portion of the emission data set.

17. A computer readable medium in accordance with claim 15 wherein the program is further programmed to instruct the scatter correction module to:
fit the estimated scatter vector to the emission data set in each projection plane using a least squares fit algorithm to determine the quantity of secondary emission particles in a tail region portion of the emission data set for each projection plane; and
subtract a summed set of estimated scatter vectors from the emission data in the tail region portion of the emission data set.

18. A computer readable medium in accordance with claim 15 wherein the program is further programmed to instruct the scatter correction module to:
fit the estimated scatter vector to the emission data set using a linear least squares fit algorithm to determine the quantity of secondary emission particles in a tail region portion of the emission data set; and
subtract the determined quantity from the emission data in the tail region portion of the emission data set to generate a final scatter estimate.

19. A computer readable medium in accordance with claim 15 wherein the program is further programmed to instruct the scatter correction module to:
sum a plurality of estimated scatter vectors to generate a final scatter estimate that represents an amount of secondary emission data in a tail region portion of the emission data set, wherein each estimated scatter vector represents the scatter in a tail region at a different projection plane and projection angle; and
subtract the final scatter estimate from emission data in the field of view.

20. A computer readable medium in accordance with claim 15 wherein the program is further programmed to instruct the scatter correction module to:
apply the scatter correction model to emission data in the emission data set that is outside the FOV using a linear least squares fit algorithm to derive an estimated scatter vector for each projection plane and projection angle in the emission data set; and
sum a plurality of estimated scatter vectors to generate a final scatter estimate that represents an amount of secondary emission data in the emission data outside the field of view, wherein each estimated scatter vector represents the scatter in the emission data outside the field of view at a different projection plane and projection angle.

* * * * *